(12) United States Patent
Fujikake et al.

(10) Patent No.: US 9,604,555 B2
(45) Date of Patent: Mar. 28, 2017

(54) VEHICLE SEAT

(71) Applicant: TACHI-S CO., LTD., Akishima-Shi, Tokyo (JP)

(72) Inventors: Tsutomu Fujikake, Akishima (JP); Yutaka Sodeno, Akishima (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 14/911,855

(22) PCT Filed: Apr. 10, 2014

(86) PCT No.: PCT/JP2014/060357
§ 371 (c)(1),
(2) Date: Feb. 12, 2016

(87) PCT Pub. No.: WO2015/022790
PCT Pub. Date: Feb. 19, 2015

(65) Prior Publication Data
US 2016/0200224 A1   Jul. 14, 2016

(30) Foreign Application Priority Data

Aug. 13, 2013 (JP) .................................. 2013-167944

(51) Int. Cl.
*A47C 1/08* (2006.01)
*B60N 2/28* (2006.01)
(Continued)

(52) U.S. Cl.
CPC ............. *B60N 2/289* (2013.01); *B60N 2/286* (2013.01); *B60N 2/2887* (2013.01); *B60N 2/58* (2013.01); *B60N 2/6009* (2013.01)

(58) Field of Classification Search
CPC ......... B60N 2/2887; B60N 2/286; B60N 2/58
(Continued)

(56) References Cited

U.S. PATENT DOCUMENTS 5,139,311 A * 8/1992 Imai .......................... B60N 2/58
297/481
5,918,934 A * 7/1999 Siegrist ................ B60N 2/2821
296/64

(Continued)

FOREIGN PATENT DOCUMENTS

DE         10044621 C1 *  2/2002  ........... B60N 2/6009
DE     102009036726 A1 *  2/2011  ........... B60N 2/2887
(Continued)

OTHER PUBLICATIONS

International Search Report corresponding to Application No. PCT/JP2014/060357; Date of Mailing: May 20, 2014, with English translation.

*Primary Examiner* — Laurie K Cranmer
(74) *Attorney, Agent, or Firm* — Cantor Colburn LLP

(57) ABSTRACT

A vehicle seat includes anchors to engage with engagement members provided on a child seat; a pad having recesses provided either at a rear edge of a seat cushion or a lower edge of a seatback; a trim cover covering the pad and having openings above the pad recesses; and bezels covering and hiding the pad recesses. Each of the anchors may comprise left and right side bars and a front bar connecting front ends of the side bars and is U-shaped, each of the bezels is box-shaped, has an upper and lower flaps formed integral and defining a bottom wall of the bezel, and covers the pad recess, providing a space in the pad recess located behind the flaps, each front bar is located in front of or behind the flaps, and each of the engagement members provided on the child seat is able to engage with the anchor.

13 Claims, 6 Drawing Sheets

(51) Int. Cl.
*B60N 2/58* (2006.01)
*B60N 2/60* (2006.01)

(58) Field of Classification Search
USPC .......................................................... 297/253
See application file for complete search history.

(56) References Cited

U.S. PATENT DOCUMENTS

| | | | | |
|---|---|---|---|---|
| 6,196,628 B1 * | 3/2001 | Goy | B60N 2/2821 297/250.1 |
| 6,322,141 B1 * | 11/2001 | Dutkievic | B60N 2/2893 24/662 |
| 6,416,128 B1 * | 7/2002 | Fujii | B60N 2/2893 297/218.1 |
| 6,582,016 B1 * | 6/2003 | Kirchoff | B60N 2/286 297/253 |
| 6,601,917 B1 * | 8/2003 | Christopherson | B60N 2/2821 24/633 |
| 6,681,969 B1 * | 1/2004 | Giedeman, III | B60R 7/043 224/275 |
| 7,093,896 B2 * | 8/2006 | Morita | B60N 2/2821 297/253 |
| 7,281,763 B1 * | 10/2007 | Hayashi | B60N 2/2893 297/253 |
| 7,699,396 B2 * | 4/2010 | Ghisoni | B60N 2/58 297/188.2 |
| 8,434,828 B2 * | 5/2013 | Arata | B60N 2/289 297/353 |
| 8,662,583 B2 * | 3/2014 | Guadagno | B60N 2/5833 297/218.1 |
| 8,740,309 B2 * | 6/2014 | Kajihara | B60N 2/58 297/452.38 |
| 8,991,918 B2 * | 3/2015 | Nakakita | B60N 2/2893 248/503.1 |
| 9,010,856 B2 * | 4/2015 | Krankkala | B60N 2/60 297/219.1 |
| 2009/0273215 A1 * | 11/2009 | Barker | B60N 2/2821 297/253 |
| 2010/0276972 A1 * | 11/2010 | Dickinson | B60N 2/2809 297/216.11 |
| 2011/0156460 A1 * | 6/2011 | Abe | B60N 2/2881 297/250.1 |
| 2013/0221715 A1 * | 8/2013 | Mantke | B60N 2/289 297/217.1 |

FOREIGN PATENT DOCUMENTS

| | | | | |
|---|---|---|---|---|
| DE | 102010032378 A1 * | 2/2012 | ........... B60N 2/2887 |
| JP | 2001206124 A | 7/2001 | |
| JP | 2002104037 A | 4/2002 | |
| JP | 2002240603 A | 8/2002 | |
| JP | 2010064636 A | 3/2010 | |
| JP | 4474097 B2 * | 6/2010 | ........... B60N 2/6009 |
| JP | 4949371 B2 * | 6/2012 | ........... B60N 2/6009 |
| JP | 5402591 B2 * | 1/2014 | ............... B60N 2/58 |

* cited by examiner

VEHICLE SEAT

CROSS REFERENCE TO RELATED APPLICATIONS

This is the U.S. national stage of application No. PCT/JP2014/060357 dated Apr. 10, 2014. Priority under 35 U.S.C. §119(a) and 35 U.S.C. §365(b) is claimed from Japanese Patent Application No. 2013-167944, filed Aug. 13, 2013, the entire contents of which are incorporated herein by reference.

BACKGROUND OF THE INVENTION

Field of the Invention

This invention relates to a vehicle seat (vehicular seat) having anchors that accord with the ISO-FIX standard and can hold an ISO-FIX type child seat.

Description of the Related Art

The ISO-FIX standard is known as international standard of systems for holding child seats to vehicle seats. A vehicle seat is disclosed in, for example, JP 2002-104037A. The vehicle seat has anchors that accord with the ISO-FIX standard and can hold an ISO-FIX type child seat.

The child seat of ISO-FIX type has a pair of engagement members, i.e., left and right engaging members, at the rear part. The engagement members are engaged with anchors. The anchors may be arranged at, the rear edge of the seat cushion of a vehicle seat or at the lower edge of the seatback thereof.

An anchor is known, which has been formed by bending a wire member (or solid rod member). The anchor has a pair of side bars (i.e., left and right side bars) and a front bar. The left and right side bars extend forwards and parallel to each other. The front bar couples the upper (front) ends of the left and right side bars, and the anchor is substantially U-shaped as seen in the plan view.

The left and right engagement members are extending rearwards. Each engagement member has a bifurcated shape in side view and has, at the rear end, a groove. The front bar of each anchor may be engaged in the groove made in the rear end of the engagement member, to hold the child seat to the vehicle seat.

In most cases, the lower arm of each engagement member is shorter than the upper arm, and may smoothly come into engagement with the front bar of the associated anchor.

The anchors are provided at the rear edge of the seat cushion or the lower edge of the seatback. The seat cushion and the seatback are each composed of a frame (i.e., skeleton member, namely seat cushion frame or seatback frame), a pad made of foamed material such as urethane foam and covering the frame, and a trim cover covering the pad. Recesses in which the anchors are arranged are prepared on the pad. To provide the anchors at the rear edge of, for example, the seat cushion, the seat cushion frame is composed of left and right side frames and two connecting pipes, one connecting front ends of the side frames and the other connecting the rear ends of the side frames. Therefore, the seat cushion frame is a substantially rectangular frame as seen in plan view. The anchors are secured to the rear connecting pipe and arranged in the recesses of the pad at the rear edge of the seat cushion.

If the pad recesses and the anchors arranged in the pad recesses are seen, the outer appearance of the vehicle seat will be impaired. It is therefore proposed that bezels, each shaped like a box and having an opening at the upper end, should cover the pad recesses to hide the pad recesses.

JP 2002-104037A, for example, discloses a configuration in which bezels cover the pad recesses (or are fitted therein), covering the openings of the pad recesses with caps that can be opened and closed. In this configuration, flanges are used, the bezels cover the pad recesses (or be fitted therein), and the anchors extend into the pad recesses, respectively, through the holes (bottom holes) made in the bottom walls (bottoms or backs) of the bezels.

In this configuration, the bezels hide the pad recesses, and caps cover the pad recesses and hide the anchors held in the pad recesses if the child seat is not attached to the vehicle seat (in the normal state). Hence, the vehicle seat is not impaired in outer appearance. The caps of the bezels may be opened, exposing the pad recesses, and the engagement members of the child seat may be engaged with the front bars of the anchors held in the pad recesses exposed. In this case, the child seat is attached to the vehicle seat.

JP 2010-064636A discloses a configuration in which a pair of bezels, each having a rectangular flange and made of unwoven fabric impregnated with synthetic resin, are attached to the pad recesses, respectively. The left and right parts of the flange of each bezel are sewn at the edges of the trim cover located around the pad recess. The bezels are thereby held in the pad recesses. Each bezel has a slit made in the bottom wall, and the associated anchor projects into the associated bezel through the slit.

In this configuration, however, the anchors are seen on the bottom of the bezels because the bezels do not have caps. Nonetheless, since the bezels hide the pad recesses, the vehicle seat is not greatly impaired in outer appearance even while the child seat remains not attached to the vehicle seat.

Patent Literature 1: Japanese Patent unexamined Publication JP 2002-104037A

Patent Literature 2: Japanese Patent unexamined Publication JP 2010-064636A

In the configuration disclosed in JP 2002-104037A, the bezels each having a cap are made of relatively hard resin such as PP (polypropylene). Therefore, if the pad recesses are positioned at the occupant's seating position, the bezels each having the cap are fitted in the pad recesses and the caps cover the bezels while the child seat remains not attached to the vehicle seat, the caps will contact the buttocks or back of the occupant, possibly making the occupant feel uncomfortable.

If only fitted in the pad recesses, the bezels will hardly be secured in the pad recesses steadfast.

For example, wires for securing the bezels may be buried in the pad and stretched in the pad recesses, the holding strips to be held by these wires may be formed on the bottom walls of the bezels, and the holding strips may hold the wires to secure the bezels in the pad recesses. In this case, however, the configuration will be complicated, and its manufacturing cost will increase.

Further, if the pad recesses are left uncovered when the child seat is attached to the vehicle seat, the pad recesses will be seen through the holes (bottom holes) made in the bottom wall (or back) of the bezels. This inevitably impairs the outer appearance of the vehicle seat.

In the configuration disclosed in JP 2010-064636A, the flange of each bezel is sewn to the trim cover. Both bezels are therefore reliably attached to in the pad recesses. Moreover, since the bezels are made of unwoven fabric impregnated with synthetic resin, they would not make the occupant of the vehicle seat feel uncomfortable because the unwoven fabric is soft. The bezels indeed hide the pad recesses, not greatly impairing the outer appearance of the vehicle seat. However, since the bezels have no caps, the anchors are seen on the bottoms of the bezels if the child seat is not attached to the vehicle seat. This is undesirable in terms of the outer appearance. Further, the pad recesses are seen through the slits made in the bottom walls of the bezels, though the slits are smaller than the bottom holes in the configuration of JP 2002-104037A. This inevitably impairs the outer appearance of the vehicle seat.

In the known configurations described above, even if the bezels are attached to the pad recesses to hide the pad recesses, the pad recesses are seen through the bottom holes or slits made in the bottom walls of the bezels to guide the anchors. Consequently, the vehicle seats are impaired in terms of outer appearance.

An object of this invention according to one aspect of the embodiment is to provide a vehicle seat which is so configured that the pad recesses are never seen through the bottom holes or slits made, for the anchors, in the bottom walls of the bezels, and which is not impaired the outer appearance.

SUMMARY OF THE INVENTION

To achieve the object, each bezel is a flexible member having integral upper and lower flaps that serve as bottoms.

More specifically, in this invention according to one aspect of the embodiment of claim 1, a vehicle seat includes anchors able to engage with engagement members provided on a child seat, thereby to hold the child seat; a pad having recesses provided either at a rear edge of a seat cushion or a lower edge of a seatback; a trim cover covering the pad and having openings above the pad recesses; and bezels covering and hiding the pad recesses; wherein each of the anchors comprises left and right side bars and a front bar connecting front ends of the side bars and is U-shaped as viewed in a plane, each of the bezels is box-shaped, made of flexible material, has an upper flap and a lower flap formed integral and defining a bottom wall of the bezel in the pad recess, and covers the pad recess, providing a space in the pad recess located behind the upper and lower flaps, each front bar of the anchors is located in front of or behind the upper and lower flaps in each of the pad recesses, and each of the engagement members provided on the child seat is able to engage with the associated anchor, each of the bezels has a cap, and engagement grooves and engagement projections to be able to fit in and remove from the bezel are provided between the bezels and the caps.

In this invention according to one aspect of the embodiment of claim 1, the bottom wall of each bezel has upper and lower flaps made of flexible material. The space through which to project the anchors into the bezels can therefore be freely provided, and bottom holes or slits need not be made in the bottoms of the bezels. Therefore, the pad recesses are never seen through such bottom holes or slits, preventing the vehicle seat from being impaired in terms of outer appearance. Moreover, the upper and lower flaps serving as bottom wall hide the pad recesses, also preventing the vehicle seat from being impaired in terms of outer appearance.

A vehicle seat including anchors able to engage with engagement members provided on a child seat, thereby to hold the child seat; a pad having recesses provided either at a rear edge of a seat cushion or a lower edge of a seatback; a trim cover covering the pad and having openings above the pad recesses; and bezels covering and hiding the pad recesses; wherein each of the anchors comprises left and right side bars and a front bar connecting front ends of the side bars and is U-shaped as viewed in a plane, each of the bezels is box-shaped, made of flexible material, has an upper flap and a lower flap formed integral and defining a bottom wall of the bezel in the pad recess, and covers the pad recess, providing a space in the pad recess located behind the upper and lower flaps, each front bar of the anchors is located in front of or behind the upper and lower flaps in each of the pad recesses, and each of the engagement members provided on the child seat is able to engage with the associated anchor, each of the bezels has a cap, and engagement grooves and engagement projections to be able to fit in and remove from the bezel are provided between the bezels and the caps.

DETAILED DESCRIPTION OF THE INVENTION

Figure 1:
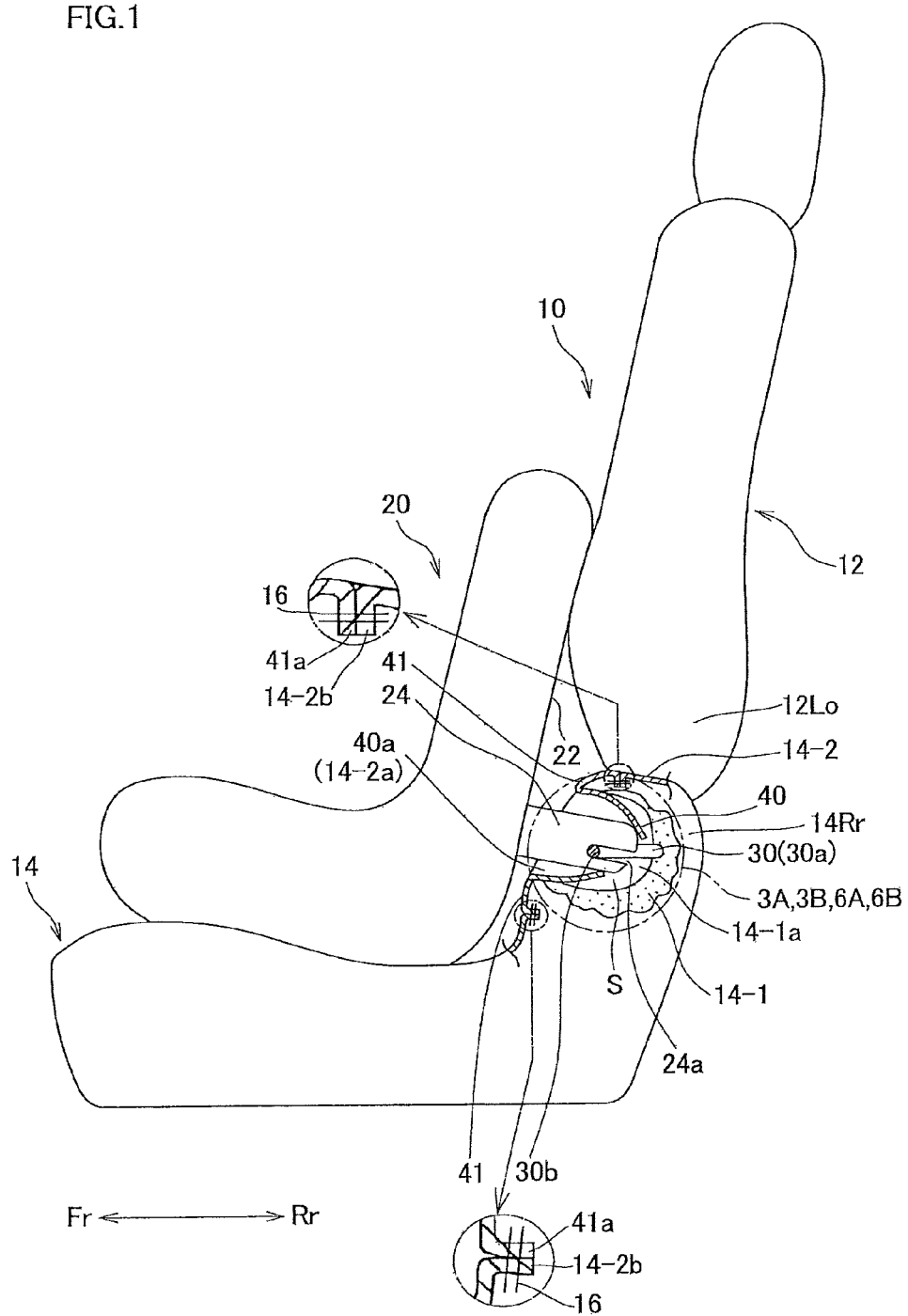
FIG. 1 is a schematic side view of a vehicle seat according to an embodiment of this invention.
Figure 2:
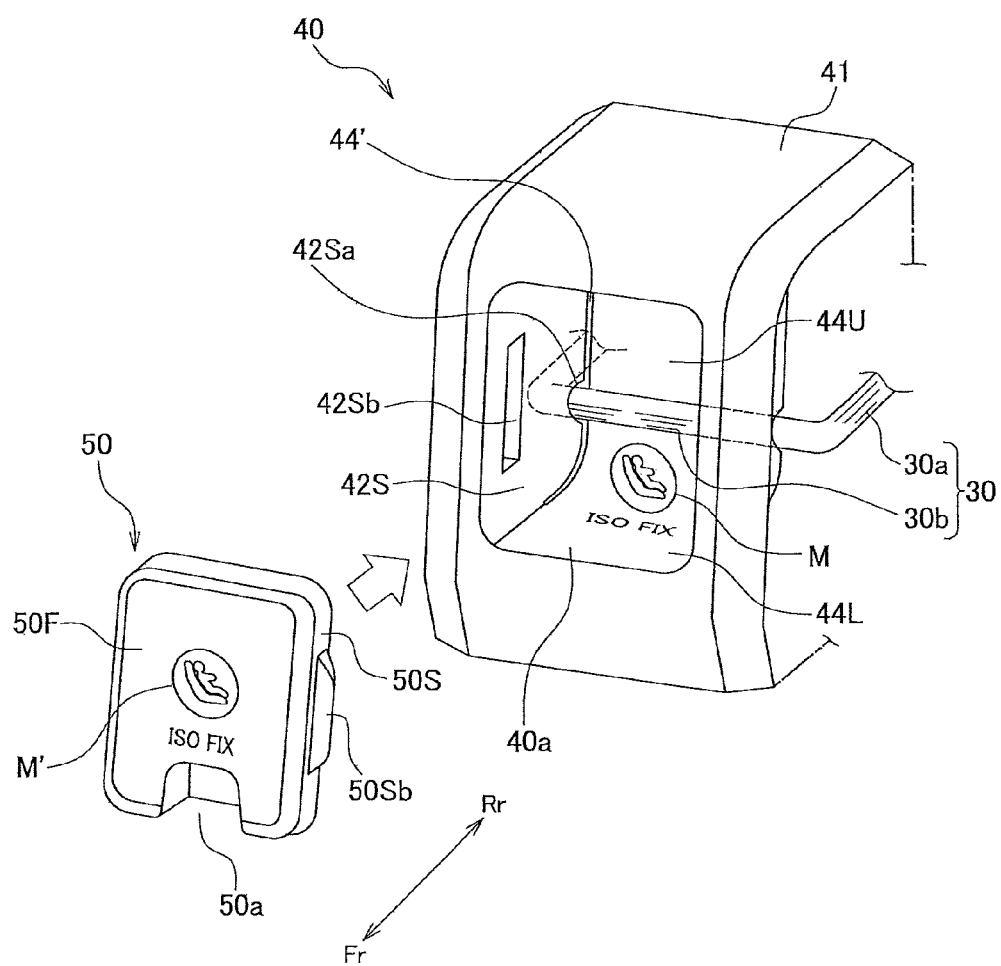
FIG. 2 is a perspective view showing the a bezel, a cap and an anchor.
Figure 3A:
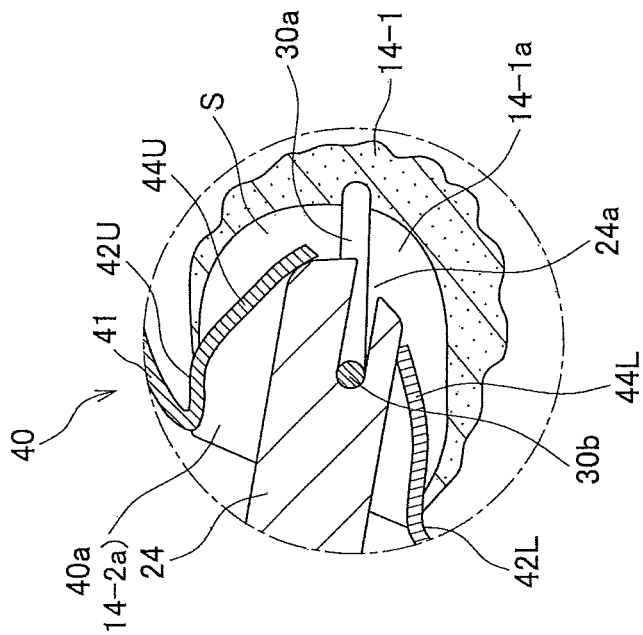
FIG. 3A is a magnified partly sectional view of the part 3A, 3B, 6A, 6B of FIG. 1, showing the state the bezel and the anchor assume while no child seat is attached to the vehicle seat.
Figure 3B:
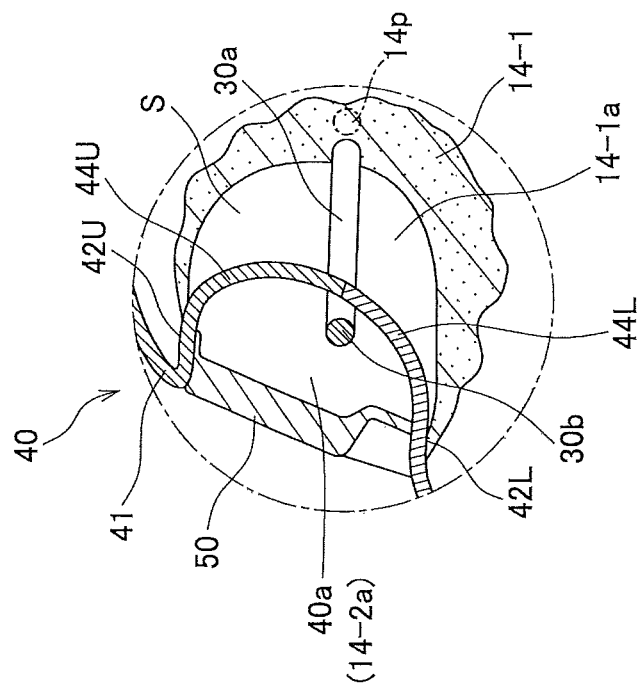
FIG. 3B is a magnified partly sectional view of the part 3A, 3B, 6A, 6B of FIG. 1, showing the state the bezel and the anchor assume while a child seat is attached to the vehicle seat.

Embodiments of this invention will be described with reference to the accompanying drawings. FIG. 1 is a schematic side view of a vehicle seat according to an embodiment of this invention. FIG. 2 is a perspective view showing a bezel, a cap and an anchor. FIG. 3A is a magnified partly sectional view of the part 3A, 3B, 6A, 6B of FIG. 1, showing the state the bezel and the anchor assume while no child seat is attached to the vehicle seat. FIG. 3B is a magnified partly sectional view of the part 3A, 3B, 6A, 6B of FIG. 1, showing the state the bezel and the anchor assume while a child seat is attached to the vehicle seat. In the drawings, arrows Fr and Rr indicate the forward and rearward directions, and arrows L and R indicate the leftward and rightward directions, with respect to the driver seated in the driver seat.

As shown in FIG. 1, the vehicle seat (vehicular seat) 10 comprises a seatback 12 and a seat cushion 14. A seat belt (not shown) is attached to the seat. The seat cushion 14 is composed of a cushion frame, a pad 14-1 made of foam such as urethane foam and covering the cushion frame, and a trim cover 14-2 covering the pad. The seatback 12 is similar to the seat cushion in terms of configuration.

The pad and the trim cover shall be described later. The pad has a pair of recesses (i.e., left and right recesses) that may hold the anchors. The trim cover that covers the pad has openings positioned above the recesses.

As shown in FIG. 1, the recesses are made in the rear edge 14Rr of the seat cushion. The configuration is not limited to this, nonetheless. The recesses may be provided in the lower edge 12Lo of the seatback.

On the rear edge 14Rr of the seat cushion 14, for example, a pair of ISO-FIX anchors 30 that accord with the ISO-FIX anchors are arranged and spaced apart by a prescribed distance in the left-right direction of the vehicle seat 10, in order to hold a child seat 20 of the ISO-FIX type.

As shown in FIG. 1, the child seat 20 has on the back a pair of engagement members (i.e., left and right members) 24. Each engagement member has upper and lower arms at the distal end, is shaped like a two-branch fork as seen from the side, and has an elongated groove (notch) 24a made between the upper and lower arms.

As shown in FIG. 2, each anchor has been made by bending a wire member (i.e., solid bar), shaped substantially like letter U as viewed in a plane. Each anchor has a pair of side bars 30a extending forward in parallel to each other and a front bar 30b connecting the front ends of the side bars. A connecting pipe 14p (see FIG. 3A), for example, extends between the rear ends of the left and right side frames of the seat cushion. The rear ends of the side bars of each anchor are secured to the connecting pipe. Each anchor extends forwards from the connecting pipe.

In most cases, the left and right engagement members 24 approach the anchors 30 from the front while the back of the child seat remains sunk and inclined. When the elongate groove (notch) 24a of each engagement member comes into engagement with the front bars of the associated anchor, the child seat 20 is held by the anchors and arranged on the seat cushion 14. When each of the engagement members is engaged with the front bar 30b of the associated anchor, the front bar reach the end of the elongated groove 24a and the engagement members is therefore engaged with the associated front bar, the anchors 30 hold the child seat 20 steadfast.

As shown in FIG. 1, the pad 14-1 is cut at the rear edge of the seat cushion 14, providing a pair of recesses (i.e., left and right recesses; pad recesses) 14-1a. The trim cover 14-2 covering the pad has openings 14-2a above the pad recesses. The pad recesses 14-1a are covered with bezels 40, respectively. Each bezel is shaped like, for example, a box (namely, box-shaped) having a bottom and opening at the top, and has a flange 41. As shown in FIG. 1, the flange 41 is secured to the trim cover 14-2, for example sewn to that edge of the trim cover, which surrounds the opening, and covers the pad recesses 14-1a.

Each bezel 40 having a flange and shaped like a box (namely, box-shaped) has upper, lower, left and right walls that are formed integral, and is made of material rich in flexibility, such as elastomer. Of the upper, lower, left and right walls, each of the upper wall 42U and lower wall 42L has the rear half spaced from the left and right walls (side walls) 42S. Therefore, the rear halves of the upper wall 42U and lower wall 42L function as flaps 44U and 44L that can move up and down. The upper and lower flaps constitute the bottom wall (i.e., bottom) of the bezel in the pad recess. The upper flap 44U extends above the anchor 30 held in the pad recess 14-1a, and the lower flap 44L extends below the anchor. The upper and lower flaps therefore cover the anchor from above and below, defining the bottom wall of the bezel in the pad recess at the back of the front bar of the anchor.

Thus, as shown in FIG. 3A, the rear part of the upper flap 44U may bend downwards, and the rear part of the lower flap 44L may bend upwards. When the rear parts of the flaps 44U and 44L abut on each other, the bezel is closed at the bottom. To the surface of the lower flap 44L, a mark M is attached, indicating the use of ISO-FIX anchors.

In the embodiment, the upper flap 44U and the lower flap 44L, which are a part of the upper wall and a part of the lower wall abut on each other at end, leaving no gap between their ends. This embodiment is not limited to this configuration, nonetheless. It suffices if the pad recesses 14-1a are not seen through the gap between the end of the upper flap 44U and the end of the lower flap 44L. For example, a gap through which the pad recesses can hardly be seen may exist between the end of the upper flap 44U and the end of the lower flap 44L. Alternatively, the end of the upper flap 44U and the end of the lower flap 44L may extend up and down, overlapping each other and not abutting on each other, and may therefore completely hide the pad recesses.

As shown in FIG. 2, each bezel has two notches 42Sa configured to hold the front bar 30b of the associated anchor. The notches are cut in the edges (i.e., rear edges) of the left and right side walls 42S. The front bar 30b of the anchor 30 is held in the notches 42Sa cut in the edges of the side walls. Hence, the pad recesses 14-1a are concealed, and the left and right ends of the front bar 30b and the left and right side bars 30a are also concealed, and only the middle part of the front bar 30b remains in the bezel 40. The notches 42Sa are shaped like a semicircle and is large enough to hold the front bar 30b.

Two engagement grooves 42Sb are cut in the left and right side walls 42S of each bezel, in the vicinity of an opening 40a made in the upper end of the bezel. The engagement grooves 42Sb are elongated grooves, extending in the up-down direction.

The upper flap 44U and lower flap 44L (i.e., upper and lower walls) made of flexile material constitute the bottom wall of the bezel 40. Therefore, a space through which the front bar 30b of the anchor may extend into the bezel can be freely provided between the upper and lower flaps. Hence, the bezel 40 is pushed into the pad recess 14-1a as the upper flap 44U and lower flap 44L move beyond the front bar 30b of the anchor until the front bar enters the notches 42Sa and reaches the ends of the notches. As shown in FIG. 3A, the bezel 40 is then held in the pad recess, providing a space S in the recess 14-1a, at the back of the bottom wall (i.e., upper flap 44U and lower flap 44L) of the bezel.

The space through which to project each anchor 30 into the associated bezel can be freely set by using the upper flap 44U and lower flap 44L. It is therefore preferably make a bottom hole or a slit in the bottom of the bezel in order to guide the anchor. Hence, the pad recess 14-1a is never seen through such a bottom hole or a slit. This prevents the vehicle seat from being impaired in terms of outer appearance. Moreover, the upper flap 44U and lower flap 44L hide the pad recess 14-1a, which also prevents the vehicle seat from being impaired in outer appearance.

Each bezel 40 has a cap 50 not integral with the main unit. The cap 50 is made of the same flexible material as the bezel, such as elastomer.

The cap 50 has a shape identical to that of the opening 40a of the bezel. Thus, it is substantially rectangular as viewed in a plane since the opening 40a of the bezel is substantially rectangular. The cap 50 has two engagement projections 50Sb on the left and right sides, respectively. The engagement projections can be fitted in the engagement grooves 42Sb cut in the left and right side walls 42S of the bezel. To the center part of the front surface 50F of the cap, a mark M' is attached, indicating the use of ISO-FIX anchors. The cap 50 has a recess 50a cut in the lower part of its front surface 50F. The recess 50a is large enough to receive the thumb or the forefinger. The upper end of the recess 50a is so shaped that the thumb or forefinger may be fitted in it.

Until the child seat is not attached to the vehicle seat, the cap 50 remains fitted in the opening 40a of the bezel as sown in FIG. 3A. The engagement projections 50Sb provided on the sides of the cap 50 also remain fitted in the engagement grooves 42Sb cut in the side walls of the bezel. The cap 50 covers the opening 40a of the recess and therefore hides the anchor 30 provided in the bezel.

The configuration of fitting and removing the cap 50 in and from the bezel 40 is not limited to the above-described configuration in which the engagement projections 50Sb of the cap are fitted in, and removed from, the engagement grooves 42Sb of the bezel. Conversely, the engagement grooves may be cut in the sides of the cap and the engagement projections may be provided on the side walls of the bezel.

In the embodiment, the engagement projections 50Sb are provided on the left and right sides of the cap 50 and the engagement grooves 42Sb are cut in the left and right side walls of the bezel 40. Instead, the engagement projections (or engagement grooves) may be provided at the upper and lower surfaces of the cap, and the engagement grooves (or engagement projections) may be provided at the upper and lower walls of the bezel.

Alternatively, the engagement grooves and the engagement projections may be replaced by other members. For example, Velcro tape (registered trademark) may be used, with the hooks and the loop provided, respectively on the back of the cap and the front of the flange of the bezel.

If the child seat is attached to the vehicle seat, the cap 50 may be removed from the opening 40a of the bezel. The user may first insert the thumb or forefinger into the recess 50a made in the front surface of the cap and then pull the cap forwards, with the thumb or forefinger touching the upper edge of recess 50a. Then, the engagement projections 50Sb are released from the engagement grooves 42Sb. As a result, the cap 50 is removed from the bezel 40.

Next, the engagement members 24 provided on the child seat are pushed into the bezel 40 through the opening 40a. Then, the engagement members 24 are further pushed, remaining in engagement with the front bar 30b of the anchor. The distal ends of the engagement members therefore abuts on the upper flap 44U and lower flap 44L that constitute the bottom wall of the bezel.

The upper flap 44U and lower flap 44L are made of flexible material, and are pushed rearwards and bent if the engagement members 24 abut on them. As a result, the upper flap 44U and lower flap 44L slip into the space S in the pad recess located behind them and expand in the space S, and do not prevent the engagement members from being pushed in.

As shown in FIG. 3B, each of the engagement members 24 keep pushing the upper flap 44U and lower flap 44L rearwards until the front bar 30b of the anchor reaches the end of the elongate groove 24a of the engagement member 24. The upper flap 44U and lower flap 44L are pushed into the bezel 40, expanding in the space S and the engagement member 24 is thereby engaged with the associated anchor 30 existing in the bezel.

As the front bar 30b of the anchor is engaged in the elongate grooves 24a made in the distal ends of the engagement members 24, the child seat 20 is held by the anchor 30 and thereby set at the prescribed position on the seat cushion 14.

If the engagement members 24 release the anchor 30 and are pulled out of the bezel 40, the child seat 20 can be removed from the seat cushion 14.

Once the engagement members 24 release the anchor 30 and have been disengaged from the anchor and pulled from the bezel 40, the upper flap 44U and lower flap 44L, both made of flexible material, restore their initial shapes because of their elasticity. Namely, when the engagement members 24 are pulled from the bezel 40, they no longer apply a pushing force to the upper flap 44U and lower flap 44L. The upper flap 44U and lower flap 44L bend because of their elasticity. Then, the upper flap 44U and lower flap 44L restore their initial shapes shown in FIG. 3A, abutting on each other at the edge and defining the bottom wall of the bezel. As a result, the upper flap and lower flap hide the pad recess 14-1a and the left and right side bars 30a. Only the middle part of the front bar 30b therefore remains in the bezel 40.

The pad recesses 14-1a are provided in the rear edge of the seat cushion, and the bezels 40 having a cap each are fitted in the pad recesses. Assume that a person sits on the vehicle seat if the child seat is not attached to the vehicle seat and the caps 50 therefore cover the bezels. Since the bezels and caps are made of flexible material such as elastomer, they never make the occupant feel uncomfortable when they contact the occupant.

Further, the flanges 41 can be sewn to the edge of the trim cover since the bezels having a flange each are made of flexible material. The bezels can therefore be easily attached to the pad recesses 14-1a as the flanges 41 are sewn to the trim cover 14-2.

In the embodiment, the flange 41 of each bezel is sewn, at a folded end 41a, to the folded edge 14-2b of the trim cover 14-2, as seen from FIG. 1. In FIG. 1, references 16 shows sewing (sewing parts). The sewing parts 16 sewn together are hidden inside, and the cap 50 lies in a same plane with a front of the bezel. Therefore, nothing protrudes, not making the occupant feel uncomfortable.

Figure 4A:
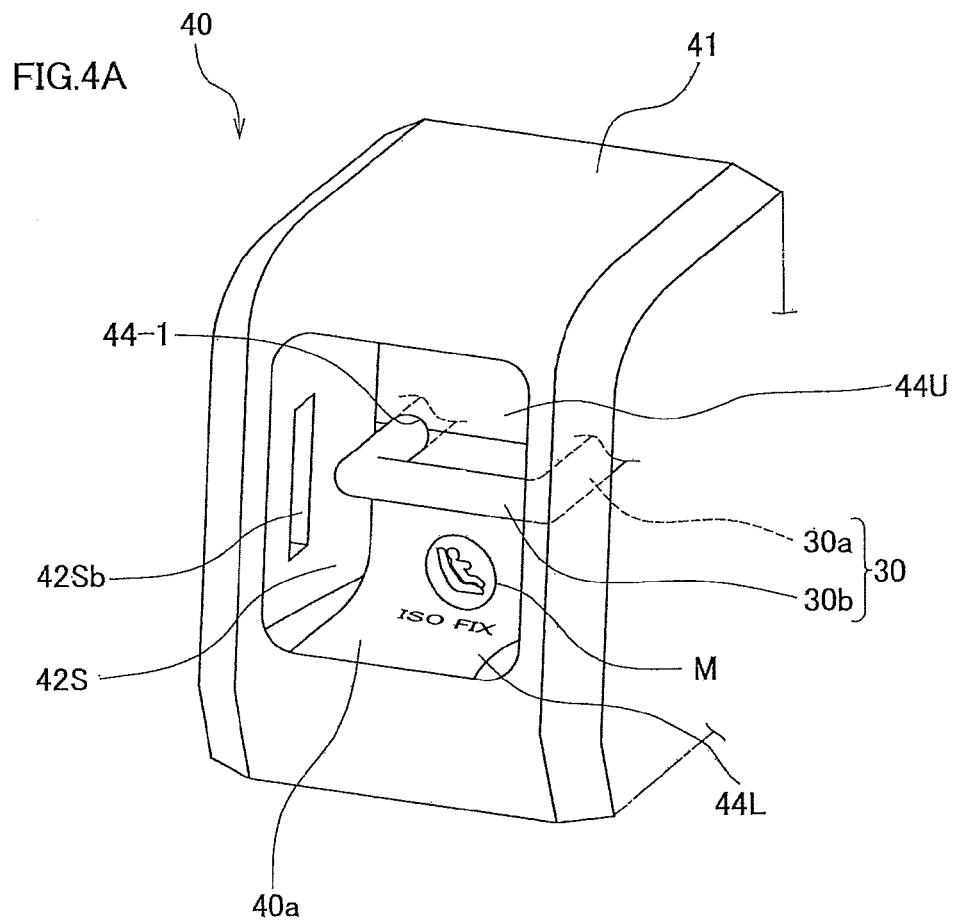
FIG. 4A is a perspective view of the bezel and the anchor used in a vehicle seat according to another (second) embodiment of this invention.
Figure 4B:
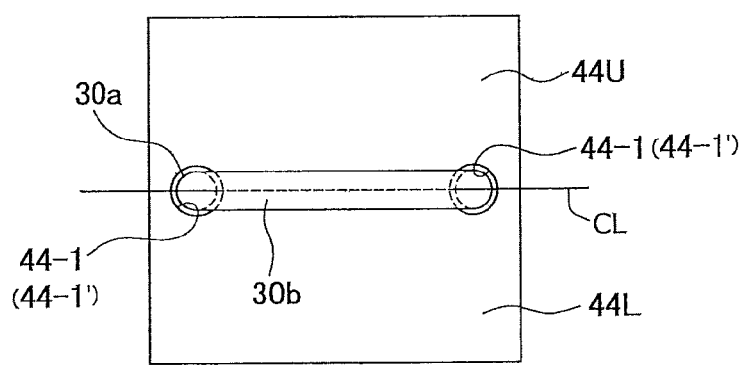
FIG. 4B is a front view of the flaps of the bezel.

FIG. 4A is a perspective view of the bezel and the anchor used in a vehicle seat according to another (second) embodiment of this invention. FIG. 4B is a front view of the flaps of the bezel. The components of the second embodiment, which are identical to those of the above-described embodiment (i.e., Embodiment 1) are designated by the same reference numbers, and will not be explained. Only the components different from those of Embodiment 1 will be described in the main.

In Embodiment 1, the side walls 42S cover the left and right side bars 30a of the anchor. By contrast, the upper flap 44U and lower flap 44L cover the left and right side bars 30a of the anchor in Embodiment 2. Embodiment 2 differs from Embodiment 1 in this respect.

In Embodiment 2, two insertion holes 44-1 through which the side bars 30a of the anchor can be inserted are made in the ends (rear ends) of the upper flap 44U and lower flap 44L, at the positions corresponding to the position of the side bars. The insertion holes 44-1 are spaced apart in the left-right direction so that the left and right side bars 30a may be inserted through them.

The insertion holes 44-1 have a shape that corresponds to the cross-sectional shape of the side bars 30a. Since the side bars have a circular cross section, two semicircular notches 44-1' are cut in the lower edge of the upper flap 44U, and two semicircular notches 44-1' are cut in the upper edge of the lower flap 44L. The first mentioned semicircular notches are combined with the second mentioned semicircular notches, defining two circular insertion holes.

However, it suffices that upper notches made in the lower edge of the upper flap 44U are combined with the lower notches made in the upper edge of the lower flap 44L, thereby to provide insertion holes 44-1 through which to insert the side bars. Instead of making two semicircular notches 44-1' in the edge of the upper flap 44U above center line CL, and two semicircular notches in the edge of the lower flap 44L below the center line CL, arched notches smaller than the semicircular notches may be cut in the edge of one flap and elongate notches may be cut in the edge of the other flap.

As shown in FIG. 4A, the side bars 30a of the anchor are inserted through the insertion holes 44-1 made partly in the upper flap 44U and partly in the lower flap 44L, and the front bar 30b of the anchor extends into the bezel, together with a part of either side bar.

As in Embodiment 1, the upper flap 44U and lower flap 44L of each bezel freely set the space S through which to project the anchor 30 into the bezel, also in Embodiment 2.

Therefore, a bottom hole or a slit need not be made in the bottom of the bezel, through which the anchor may extend. Hence, each of the pad recesses is never seen through the bottom hole or slit of the bezel, preventing the vehicle seat from being impaired in terms of outer appearance. In Embodiment 2, not only the front bar 30b, but also the side bars extend, in part, into the bezel. Nonetheless, this does not impair the outer appearance of the vehicle seat, because the upper and lower flaps define the bottom wall of the bezel 40 and therefore hide the pad recess 14-1a.

In order to attach the child seat to the vehicle seat, the caps 50 are removed from the bezels 40. Then, the engagement members 24 of the child seat are pushed into the bezel 40 through the opening 40a. The engagement members are further pushed into the bezel 40 until the front bar 30b of the anchor reaches the ends of the elongate grooves 24a, while remaining in engagement with the front bar 30b of the anchor. The engagement members 24 are thereby engaged with the anchor 30.

If the front bar 30b of the anchor protrudes from the upper flap 44U and lower flap 44L by a distance shorter than the distance the front bar extends to the ends of the elongate grooves 24a, the engagement members 24 will abut on the upper and lower flaps. In this case, the engagement members 24 bend the upper and lower flaps, causing them to move into the space S in the pad recess located behind them. The engagement members are therefore engaged with the associated anchor. If the front bar 30b protrudes by a long distance, the engagement members 24 will be engaged with the associated anchor, without abutting on the upper or lower flap.

Figure 5:
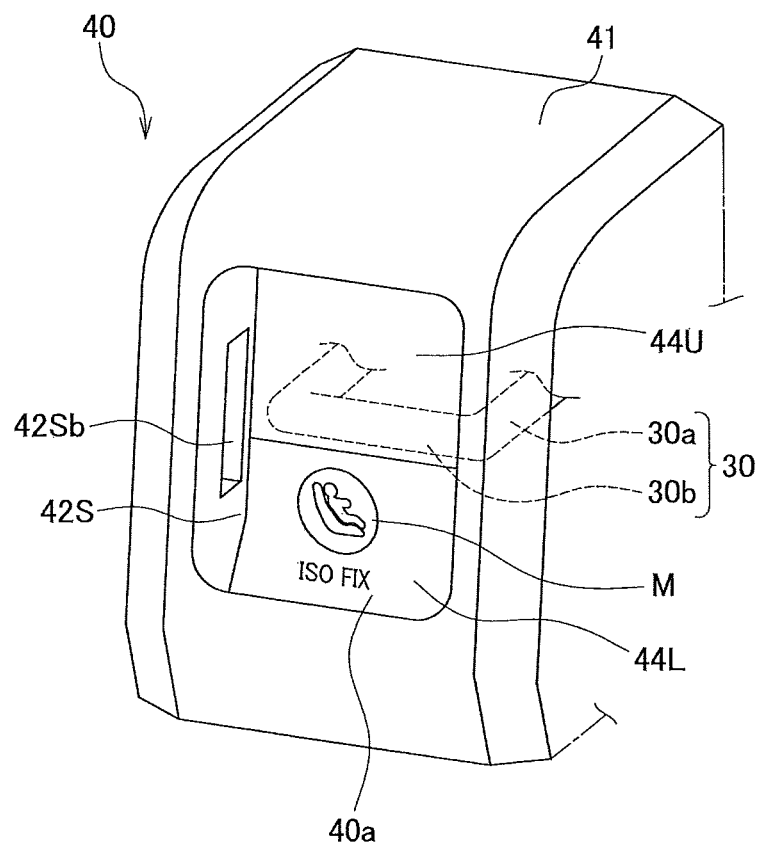
FIG. 5 is a perspective view of the bezel and the anchor used in a vehicle seat according to still another (third) embodiment of this invention.
Figure 6A:
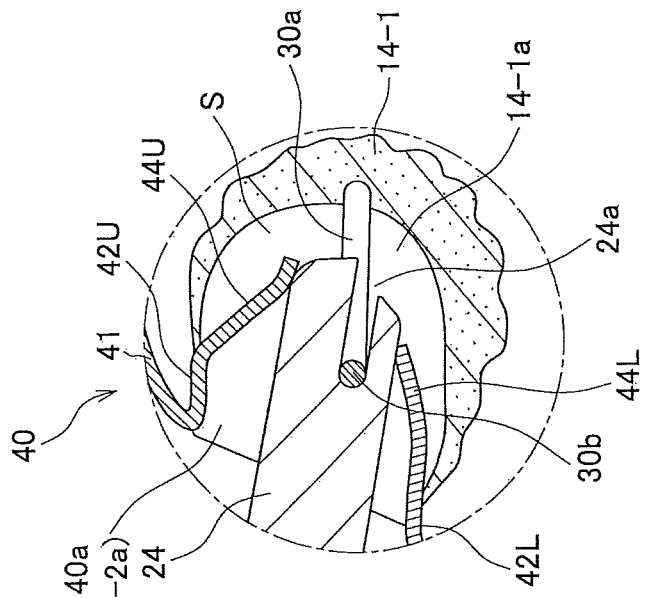
FIG. 6A is a magnified partly sectional view of the part 3A, 3B, 6A, 6B of FIG. 1, showing the state the bezel and the anchor assume while no child seat is attached to the vehicle seat.
Figure 6B:
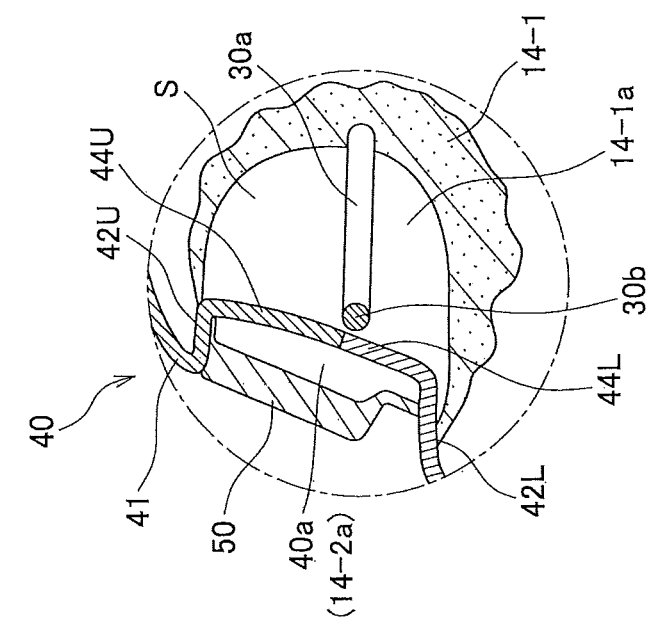
FIG. 6B is a magnified partly sectional view of the part 3A, 3B, 6A, 6B of FIG. 1, showing the state the bezel and the anchor assume while a child seat is attached to the vehicle seat.

FIG. 5 is a perspective view of the bezel and the anchor used in a vehicle seat according to still another (third) embodiment of this invention. FIG. 6A is a magnified partly sectional view of the part 3A, 3B, 6A, 6B of FIG. 1, showing the state the bezel and the anchor assume while no child seat is attached to the vehicle seat. FIG. 6B is a magnified partly sectional view of the part 3A, 3B, 6A, 6B of FIG. 1, showing the state the bezel and the anchor assume while a child seat is attached to the vehicle seat.

The components of the third embodiment, which are identical to those of the above-described embodiment (i.e., Embodiment 1) are designated by the same reference numbers, and will not be explained. Only the components different from those of Embodiment 1 will be described in the main.

In Embodiment 3, the upper flap 44U and lower flap 44L define the bottom wall of the bezel in front of the front bar of the anchor, covering and hiding the anchor 30. Embodiment 3 differs from Embodiment 1 in this respect. That is, the front bar 30b is positioned at the back of the upper flap 44U and lower flap 44L.

In this configuration, the bottom wall of the bezel 40, which is constituted by the upper flap 44U and lower flap 44L, is provided in front of the anchor 30. The anchor 30 and the pad recess 14-1 are therefore completely concealed. Since the upper flap 44U and lower flap 44L made of flexile material constitute the bottom wall, a space S through which the front bar 30b of the anchor may extend into the bezel can be freely provided in the pad recess located behind the upper and lower flaps. Therefore, a bottom hole or a slit need not be made in the bottom of the bezel, through which the anchor may extend. Hence, each of the pad recesses is never seen through the bottom hole or slit of the bezel, preventing the vehicle seat from being impaired in terms of outer appearance. The engagement members 24 push the upper and lower flaps, and go into engagement with the front bar 30b positioned at the back of the upper and lower flaps.

As has been described above, in this invention the upper and lower flaps made of flexible material define the bottom wall of each bezel. Therefore, the bottom of the bezel need not have a bottom hole or a slit for guiding the anchor. Hence, the pad recess is not seen through such a bottom hole or such a slit. This prevents the vehicle seat from being impaired in terms of outer appearance. Moreover, the upper and lower flaps defining the bottom wall reliably conceal the pad recess, also preventing the outer appearance of the vehicle seat from being impaired.

The embodiments have been described to explain this invention, and are not intended to limit the scope of the invention. Accordingly, various changes and modifications may be made within the spirit or scope of this invention, and are of course included in this invention.

INDUSTRIAL APPLICABILITY

This invention is not limited to an ordinary vehicle seat for use in buses, cars and the like. It can be applied also to seats (vehicle seats) having anchors for holding a child seat, for use in trains and aircraft.

What is claimed is:

1. A vehicle seat including: anchors able to engage with engagement members provided on a child seat, thereby to hold the child seat;
  a pad having recesses provided either at a rear edge of a seat cushion or a lower edge of a seatback;
  a trim cover covering the pad and having openings above the pad recesses; and
  bezels covering and hiding the pad recesses;
  wherein each of the anchors comprises left and right side bars and a front bar connecting front ends of the side bars and is U-shaped as viewed in a plane,
  each of the bezels is box-shaped, made of flexible material, has an upper flap and a lower flap formed integral and defining a bottom wall of the bezel in the pad recess, and covers the pad recess, providing a space in the pad recess located behind the upper and lower flaps,
  each front bar of the anchors is located in front of or behind the upper and lower flaps in each of the pad recesses,
  each of the engagement members provided on the child seat is able to engage with the associated anchor;
  each of the bezels has a cap, and engagement grooves and engagement projections to be able to fit in and remove from the bezel are provided between the bezels and the caps.

2. The vehicle seat according to claim 1,
wherein each bezel has a flange,
the flange of each bezel is sewn, at a folded end, to a folded edge of the trim cover, and
parts sewn together are hidden inside.

3. The vehicle seat according to claim 2,
wherein each cap fits and lies in a same plane with a front of the bezel.

4. A vehicle seat including anchors able to engage with engagement members provided on a child seat, thereby to hold the child seat;
a pad having recesses provided either at a rear edge of a seat cushion or a lower edge of a seatback;
a trim cover covering the pad and having openings above the pad recesses; and
bezels covering and hiding the pad recesses;
wherein each of the anchors comprises left and right side bars and a front bar connecting front ends of the side bars and is U-shaped as viewed in a plane,
each of the bezels is box-shaped with upper, lower, left and right walls, made of flexible material, has an upper flap and a lower flap formed integral, with upper and lower walls and defining a bottom wall of the bezel in the pad recess, and covers the pad recess, providing a space in the pad recess located behind the upper and lower flaps;
each front bar of the anchors is in front of the upper and lower flaps in each of the pad recesses, and
each of the engagement members provided on the child seat is able to engage with the front bar of the associated anchor;
each of the bezels has a cap, and
engagement grooves and engagement projections to be able to fit in and remove from the bezel are provided between the bezels and the caps.

5. The vehicle seat according to claim 4, wherein
a pair of insertion hole are made in the ends of the upper and lower flaps, at the positions corresponding to the positions of the side bars of the anchor, the side bars are inserted through the insertion holes, and the front bar of the anchor is provided in front of the upper and lower flaps.

6. The vehicle seat according to claim 4,
wherein each bezel has a flange,
the flange of each bezel is sewn, at a folded end, to a folded edge of the trim cover, and
parts sewn together are hidden inside.

7. The vehicle seat according to claim 6,
wherein each cap fits and lies in a same plane with a front of the bezel.

8. The vehicle seat according to claim 4,
wherein a pair of notches are cut in the edges of the left and right side walls of the bezel, at the positions corresponding to the positions of the front bar of the anchor,
the front bar is inserted through the insertion holes, and
a middle part of the front bar is provided in front of the upper and lower flap in the bezel.

9. The vehicle seat according to claim 8,
wherein each bezel has a flange,
the flange of each bezel is sewn, at a folded end, to a folded edge of the trim cover, and
parts sewn together are hidden inside.

10. The vehicle seat according to claim 9,
wherein each cap fits and lies in a same plane with a front the bezel.

11. A vehicle seat including anchors able to engage with engagement members provided on a child seat, thereby to hold the child seat;
a pad having recesses provided either at a rear edge of a seat cushion or a lower edge of a seatback;
a trim cover covering the pad and having openings above the pad recesses; and
bezels covering and hiding the pad recesses;
wherein each of the anchors comprises left and right side bars and a front bar connecting front ends of the side bars and is U-shaped as viewed in a plane,
each of the bezels is box-shaped, made of flexible material, has an upper flap and a lower flap formed integral with upper and lower walls and defining a bottom wall of the bezel in the pad recess, and covers the pad recess, providing a space in the pad recess located behind the upper and lower flaps;
the upper and lower flaps of the bezel cover and hide the anchor,
each front bar of the anchors is located behind the upper and lower flaps in each of the pad recesses, and
each of the engagement members provided on the child seat is able to engage with the associated anchor;
each of the bezels has a cap, and
engagement grooves and engagement projections to be able to fit in and remove from the bezel are provided between the bezels and the caps.

12. The vehicle seat according to claim 11,
wherein each bezel has a flange,
the flange of each bezel is sewn, at a folded end, to a folded edge of the trim cover, and
parts sewn together are hidden inside.

13. The vehicle seat according to claim 12,
wherein each cap fits and lies in a same plane with a front of the bezel.

* * * * *